United States Patent Office 2,763,663
Patented Sept. 18, 1956

2,763,663

INTERMEDIATE PRODUCTS AND VAT DYE-STUFFS AND PROCESS OF MAKING SAME

Max Staeuble, Basel, Switzerland, assignor to Ciba Limited, Basel, Switzerland

No Drawing. Application August 18, 1952, Serial No. 305,063

Claims priority, application Switzerland August 20, 1951

14 Claims. (Cl. 260—329.2)

In recent years vat dyestuffs have become known which are of the acylaminoanthraquinone type and contain at least one acyl residue having an external sulphonamide group, for example, the dyestuff of the formula

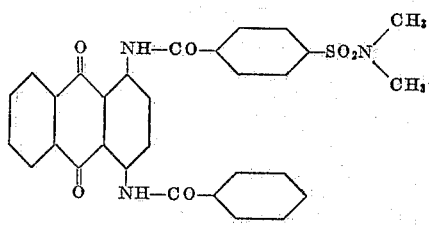

The process for making such dyestuffs involves the introduction into vattable amines of such acyl groups containing a sulphonamide group.

The present invention is based on the observation that intermediate products and vat dyestuffs can be made in a simple manner by reacting a dichloride of a cyclic sulphonic acid-carboxylic acid with a vattable amine under conditions such that only the carboxylic acid chloride group enters into reaction, and, if desired, reacting the product so obtained with a non-vattable amine which is at most a secondary amine.

The vattable amines serving as starting materials in the process of the invention may, for example, contain a skeleton consisting of a highly condensed residue or of several anthraquinone residues, or may advantageously be aminoanthraquinones. Valuable results are obtained especially with 1-aminoanthraquinones which may contain further substituents. Favourable results are obtained, for example, with 1-amino-5-acylaminoanthraquinones and especially with 1-amino-4-acylaminoanthraquinones, in which the acyl residue is advantageously a benzoyl residue.

It is obvious that the 1-aminoanthraquinones used as starting materials are preferably so chosen as to contain those substituents in the molecule which are desired to be present in the final dyestuff. Thus, they may contain a substituted benzoyl radical, such as an alkoxybenzoyl, a halogenbenzoyl, an alkylbenzoyl or a benzoyl radical containing more than one substituent customary in vat dyestuffs. The anthraquinone nucleus may contain substituents as well as preferably one or two halogen atoms especially in β-positions as shown in the examples. Such substituents do not interfere with the reactions according to the present invention.

The cyclic sulphonic acid-carboxylc acid dichlorides also used as starting materials in the present process may, if desired, contain a heterocyclic residue, for example, a thiophene residue. It is of advantage to use aromatic dichlorides, especially the dichlorides of benzene sulphonic acid-carboxylic acids. There are advantageously used dichlorides in which the positions at which the carboxylic acid chloride and sulphonic acid chloride groups are bound are separated from one another by at least one ring atom. As an example there may be mentioned the dichloride of para-sulphobenzoic acid, which can be obtained in known manner, for example, from para-benzoic acid sulphochloride by reaction with thionyl chloride or from para-sulphobenzoic acid by reaction with phosphorus pentachloride.

It is unexpected that the reaction between the vattable amines and the aforesaid dichlorides takes place practically exclusively at the carboxylic acid chloride group, without the need for special precautions. The reaction can be carried out in a manner in itself known in an inert solvent such as chlorobenzene, di- or trichlorobenzenes, naphthalene or especially nitrobenzene.

In many cases it is of advantage to conduct the acylation in the absence of basic substances, that is to say, in a non-basic reaction medium, as it appears that under these conditions reaction between the sulphochloride group and the vattable amine is avoided with great certainty.

Under these conditions the reaction is advantageously carried out at temperatures within the range of about 90–200° C. In many cases temperatures of about 125–135° C. are especially advantageous. If, however, the acylation is carried out in the presence of a pyridine base, such as pyridine itself or a picoline, lower temperatures, for example, of 30–90° C., are favourable.

The use of a certain excess, for example, a few percents to about 20 per cent, of the dichloride is not harmful and is desirable when the dichloride is soluble in the solvent used and can therefore be removed relatively easily.

The intermediate products of the invention correspond to the general formula $$R—NH—CO—R_1—SO_2Cl$$

in which R—NH— represents the residue of a vattable amine, and $R_1$ represents a cyclic residue, especially a residue of the benzene series.

These intermediate products are excellently suited for the manufacture of vat dyestuffs of the kind referred to in the opening paragraph of this specification. Thus, this invention also includes a process in which such an intermediate product is reacted with a non-vattable amine which is at most a secondary amine. As such amines there may be mentioned, for example, dialkylamines, such as methylethylamine, methylisopropylamine, piperidine, morpholine and especially symmetrical dialkylamines of low molecular weight such as diethylamine and dimethylamine.

The reaction of the aforesaid intermediate products with such amines of the aliphatic type each takes place very easily and, for example, even at relatively low temperatures, for example, at room temperature or at about 30–50° C.

The resulting dyestuffs are obtained in an unexpectedly pure state and yield.

The following examples illustrate the invention, the parts and percentages being by weight:

Example 1

54 parts of para-sulphobenzoic acid dichloride are dissolved in 600 parts of dry nitrobenzene, and 69 parts of 1-amino-4-benzoylamino-anthraquinone are introduced. The condensation is carried on for 2 hours at 125–135° C., and, after cooling, the dark red crystals are filtered off. After washing the crystals with nitrobenzene and boiling them with alcohol, there are obtained 98 parts of 1-

(benzoylamino - para - sulphochloride) - 4 - benzoylaminoanthraquinone of the following constitution:

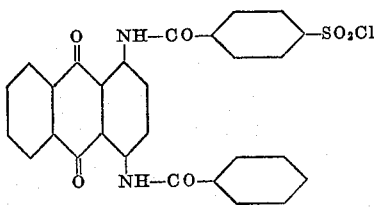

By using instead of 1-amino-4-benzoylamino-anthraquinone, 69 parts of 1-amino-5-benzoylaminoanthraquinone, there are obtained 98 parts of 1-(benzoylamino-para-sulphochloride) - 5-benzoylaminoanthraquinone of the formula

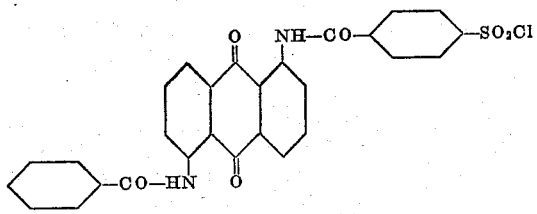

in the form of gold-yellow lamellae.

Example 2

4.8 parts of 1-(benzoylamino-para-sulphochloride)-4-benzoylaminoanthraquinone (see Example 1) are suspended in 40 parts of pyridine. 10 parts of an aqueous solution of 30 per cent. strength of dimethylamine are added and the whole is stirred for 6 hours at 30–35° C. After dilution with alcohol the dyestuff is filtered off, washed with alcohol while hot and dried. There are obtained about 4.75 parts of the dyestuff of the formula

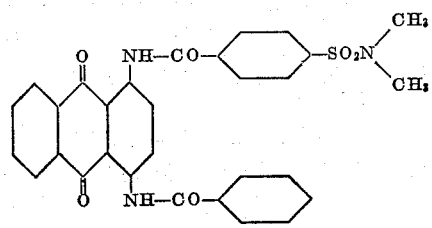

Example 3

26 parts of para-sulphobenzoic acid dichloride are dissolved for 350 parts of dry nitrobenzene. 34.4 parts of 1-amino-4-benzoylaminoanthraquinone are then added, and the whole is stirred for 1½–2 hours at 125–135° C. The mixture is cooled to room temperature, 150 parts, for example of an aqueous solution of about 30 per cent. strength of dimethylamine are run in, and the whole is stirred for a further 2 hours at 45–50° C. After cooling, the dyestuff which precipitates in the form of red crystals is worked up in the usual manner. There are obtained 50.5 parts of the dyestuff of the formula given in Example 2.

Example 4

2.45 parts of para-benzoic acid sulphochloride are dissolved in 50 parts of dry nitrobenzene with the addition of 1.6 parts of thionyl chloride while heating slowly to 90° C. and the whole is kept at this temperature until the para-benzoic acid sulphochloride is converted into para-sulphobenzoic acid dichloride and has entered into solution. After the addition of 3.44 parts of 1-amino-4-benzoylaminoanthraquinone, the mixture is heated for 1½–2 hours at 130–135° C., while stirring, the mixture is then allowed to cool and 20 parts of an aqueous solution of 30 per cent. strength of dimethylamine are added. In order to render the mixture homogeneous there may be added 10–20 parts of alcohol, and the product is then worked up after stirring for one hour. There are obtained 5.0 parts of a dyestuff which is identical with the dyestuff of Examples 2 and 3.

Example 5

5.4 parts of para-sulphobenzoic acid dichloride are dissolved in 70 parts of dry nitrobenzene with the addition of 10 parts of anhydrous pyridine, and reacted for 5 hours at 85–90° C. with 7 parts of 1-amino-4-benzoylaminoanthraquinone. 10 parts of diethylamine are then run in, the mixture is stirred for a further hour, and, after cooling, the product is worked up in the usual manner. There are obtained about 9 parts of the dyestuff of the formula

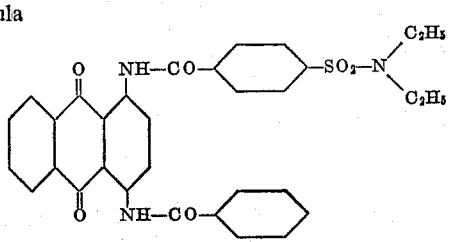

The dyestuff forms orange-red crystals and dyes cotton from a violet hydrosulphite vat very fast orange-red tints.

Example 6

13 parts of thiophene-2-carboxylic acid-5-sulphochloride melting at 135° C. (prepared from thiophene-2-carboxylic acid and chlorosulphonic acid) are stirred with 10 parts of thionyl chloride in 300 parts of dry nitrobenzene for one hour at 90° C., and then condensed with 21 parts of 1 - amino-4-benzoylamino - 6:7-dichloroanthraquinone at 125–130° C. for one to 2 hours. After cooling to 50° C., the mixture is diluted with 150 parts of ethanol, and 100 parts of an aqueous solution of about 33 per cent. strength of dimethylamine are run in. The whole is stirred for a further hour, then cooled to room temperature, and the vat dyestuff precipitated in the form of a red crystalline powder is filtered off. After washing with nitrobenzene and boiling with methanol, there remain about 26 parts of the dyestuff of the formula

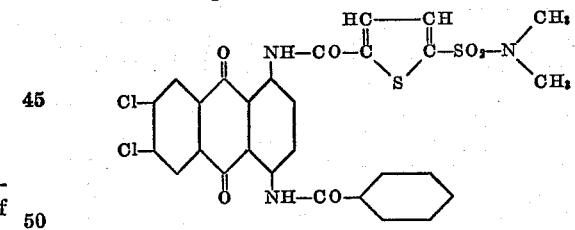

It dyes cotton from an olive-green vat pure fast violet-red tints.

Example 7

2.6 parts of meta-benzoic acid sulphochloride, 40 parts of dry nitrobenzene and 2 parts of thionyl chloride are dissolved at 90° C. while stirring. 3.8 parts of 1-amino-4-benzoylamino-7-chloranthraquinone are then added, and the condensation is carried on for 3 hours at 110–120° C. After cooling the mixture to 50–60° C., 10 parts of diethylamine are introduced dropwise and the whole is stirred for a further hour at that temperature. The crystalline dyestuff powder is worked up in the usual manner. There are obtained about 4.5 parts of the dyestuff of the formula

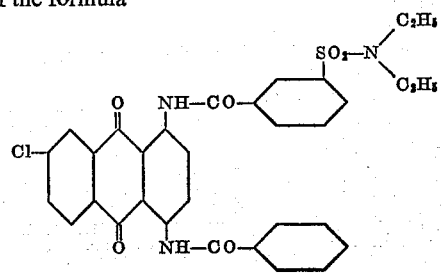

It dyes cotton from a brownish-violet vat fast pink tints.

What is claimed is:

1. An anthraquinone compound of the general formula $$Aq-NH-CO-R-SO_2Cl$$

wherein Aq stands for an anthraquinone radical customary in vat dyes and containing one 9:10-dioxoanthracene nucleus and carrying the —NH— group in an α-position and R stands for a radical selected from the group consisting of the radicals corresponding to the formulae

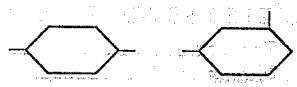

and

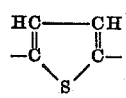

2. An anthraquinone compound of the general formula

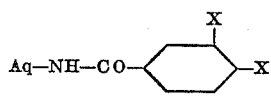

wherein Aq stands for an anthraquinone radical customary in vat dyes and containing one 9:10-dioxoanthracene nucleus and carrying the —NH— group in an α-position, one X represents a hydrogen atom and the other X represents an —SO₂Cl group.

3. An anthraquinone compound of the general formula

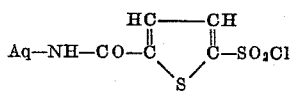

wherein Aq stands for an anthraquinone radical customary in vat dyes and containing one 9:10-dioxoanthracene nucleus and carrying the —NH— group in an α-position.

4. The anthraquinone compound of the formula

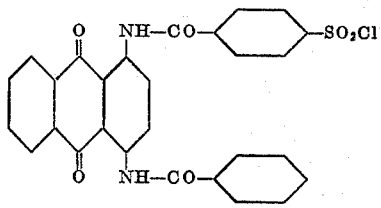

5. The anthraquinone compound of the formula

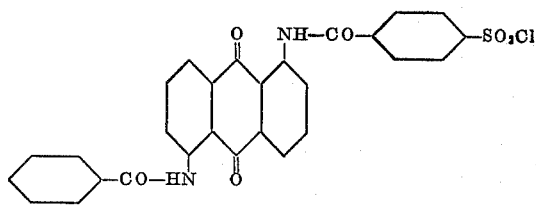

6. The anthraquinone compound of the formula

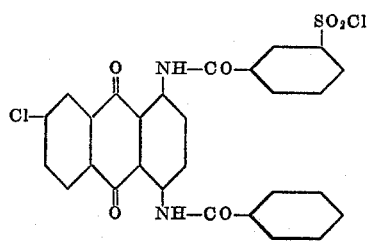

7. The anthraquinone compound of the formula

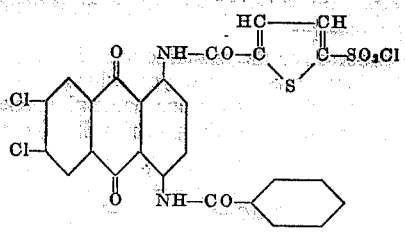

8. In a process for the manufacture of vat dyestuffs of the acyl-aminoanthraquinone type, the step which comprises reacting an α-aminoanthraquinone containing one 9:10-dioxoanthracene nucleus with a dichloride selected from the group consisting of the dichlorides corresponding to the formulae

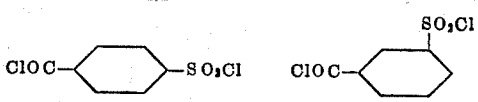

and

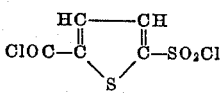

9. In a process for the manufacture of vat dyestuffs of the acylaminoanthraquinone type, the step which comprises reacting an α-aminoanthraquinone containing one 9:10-dioxoanthracene nucleus with a dichloride of the formula

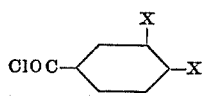

wherein one X represents a hydrogen atom and the other X represents an —SO₂Cl group.

10. In a process for the manufacture of vat dyestuffs of the acylaminoanthraquinone type, the step which comprises reacting an α-aminoanthraquinone containing one 9:10-dioxoanthracene nucleus with the dichloride of the formula

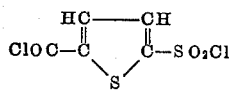

11. In a process for the manufacture of vat dyestuffs of the acylaminoanthraquinone type, the step which comprises reacting an α-aminoanthraquinone containing one 9:10-dioxoanthracene nucleus and carrying a benzoylamino group in a further α-position, with a dichloride of the formula

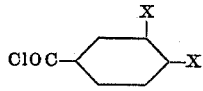

wherein one X represents a hydrogen atom and the other X represents an —SO₂Cl group.

12. A process for the manufacture of vat dyestuffs of the acylaminoanthraquinone type which comprises reacting an α-aminoanthraquinone containing one 9:10-dioxoanthracene nucleus with a dichloride selected from the group consisting of the dichlorides corresponding to the formulae

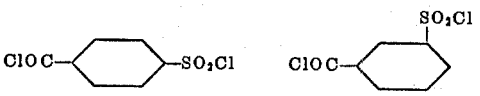

and

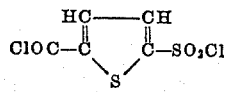

and condensing the α-acylaminoanthraquinone carrying a sulphonic acid chloride group as substituent with a lower dialkylamine.

13. A process for the manufacture of vat dyestuffs of the acylaminoanthraquinone type which comprises reacting an α-aminoanthraquinone containing one 9:10-dioxoanthracene nucleus with a dichloride of the formula

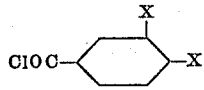

wherein one X represents a hydrogen atom and the other X represents an —SO₂Cl group and condensing the α-acylaminoanthraquinone carrying a sulphonic acid chloride group as substituent with a lower dialkylamine.

14. A process for the manufacture of vat dyestuffs of the acylaminoanthraquinone type which comprises reacting an α-aminoanthraquinone containing one 9:10-dioxoanthracene nucleus with the dichloride of the formula

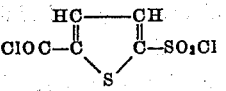

and condensing the α-acylaminoanthraquinone carrying a sulphonic acid chloride group as substituent with a lower dialkylamine.

References Cited in the file of this patent
UNITED STATES PATENTS

| | | |
|---|---|---|
| 2,190,751 | Zerweck et al. | Feb. 20, 1940 |
| 2,505,253 | Pitman et al. | Apr. 25, 1950 |
| 2,586,233 | Kern et al. | Feb. 19, 1952 |